(12) United States Patent
Ishii et al.

(10) Patent No.: US 11,448,142 B2
(45) Date of Patent: Sep. 20, 2022

(54) EXHAUST VALVE DEVICE FOR VEHICLE

(71) Applicant: MIKUNI CORPORATION, Tokyo (JP)

(72) Inventors: Toshiaki Ishii, Odawara (JP); Makoto Koyama, Odawara (JP); Daisuke Takayama, Odawara (JP); Naoki Tanaka, Odawara (JP)

(73) Assignee: MIKUNI CORPORATION, Tokyo (JP)

(*) Notice: Subject to any disclaimer, the term of this patent is extended or adjusted under 35 U.S.C. 154(b) by 0 days.

(21) Appl. No.: 17/154,674

(22) Filed: Jan. 21, 2021

(65) Prior Publication Data

US 2021/0254560 A1    Aug. 19, 2021

(30) Foreign Application Priority Data

Feb. 14, 2020 (JP) .............................. JP2020-023456

(51) Int. Cl.
| | |
|---|---|
| *F02D 9/10* | (2006.01) |
| *F02D 9/04* | (2006.01) |
| *F16K 31/04* | (2006.01) |
| *F16K 1/22* | (2006.01) |

(52) U.S. Cl.
CPC .............. *F02D 9/106* (2013.01); *F02D 9/04* (2013.01); *F02D 9/107* (2013.01); *F02D 9/1085* (2013.01); *F02D 9/1065* (2013.01); *F16K 1/221* (2013.01); *F16K 31/043* (2013.01)

(58) Field of Classification Search
CPC ..... F02D 2009/0264; F02D 2009/0269; F02D 9/1065; F02M 26/70; F16D 3/52; F16K 1/22; F16K 1/221; F16K 27/0218
USPC .................................................. 251/305, 337
See application file for complete search history.

(56) References Cited

U.S. PATENT DOCUMENTS

| | | | | |
|---|---|---|---|---|
| 1,950,448 | A * | 3/1934 | Heisterkamp | F16D 3/72 464/57 |
| 2,514,394 | A * | 7/1950 | Irving | F16D 3/72 464/57 |
| 5,368,283 | A * | 11/1994 | Pavlin | F02D 11/04 267/155 |
| 2017/0268433 | A1* | 9/2017 | Aigner | F16K 31/045 |

(Continued)

FOREIGN PATENT DOCUMENTS

JP    2019-120252    7/2019

*Primary Examiner* — Robert K Arundale

(57) ABSTRACT

Provided is an exhaust valve device 1 for a vehicle in which a valve element 7 is supported in an exhaust passage 4 by a rotating shaft 5 axially supported by a valve body 3, a flexible joint member 16 is secured to an output shaft 13*a* of a motor unit 13 attached to the valve body 3, and a lower end of the flexible joint member 16 and an upper end of the rotating shaft 5 are coupled via a rigid joint member 15, in which the rigid joint member 15 includes: a sealing element 18 having a sealing surface 18*a* and arm portions 18*c*, the sealing surface 18*a* being coupled to one end of the rotating shaft 5 and sealing an axially supported portion of one end of the rotating shaft to prevent exhaust gas from leaking, the arm portions 18*c* being formed in a periphery of the sealing surface 18*a*; and a transmission element 19 having a spring groove 19*a* and engagement grooves 19*b*, the spring groove 19*a* being coupled to the end of the flexible joint member 16, the engagement grooves 19*b* being engaged with the arm portions 18*c* of the sealing element 18 to restrict relative rotation.

5 Claims, 8 Drawing Sheets

(56) References Cited

U.S. PATENT DOCUMENTS

2017/0284310 A1* 10/2017 Delplanque ............ F02M 26/54
2019/0170092 A1*  6/2019 Oblinger ................. F02D 9/04
2020/0256477 A1*  8/2020 Schmitt .................. F02M 26/70

* cited by examiner

EXHAUST VALVE DEVICE FOR VEHICLE

CROSS REFERENCE TO RELATED APPLICATIONS

This Application claims priority from Japanese Patent Application No. 2020-023456 filed on Feb. 14, 2020, which is incorporated herein by reference in its entirety.

BACKGROUND OF THE INVENTION

Field of the Invention

The present invention relates to an exhaust valve device for a vehicle.

Description of the Related Art

Exhaust valve devices may be provided in exhaust pipes of engines mounted in four-wheel vehicles and two-wheel vehicles and are used for various purposes such as exhaust noise reduction and early warming-up of engines through exhaust pressure boosting. For example, the exhaust valve device disclosed in Japanese Patent Laid-Open No. 2019-120252 is adapted such that an upstream side and a downstream side of an exhaust pipe of an engine are caused to communicate with each other via an exhaust passage formed in a valve body and a valve element is supported to be able to be opened and closed in the exhaust passage by a t axially supported by the valve body with a pair of bearings. A motor unit is attached to the valve body, rotation of an output shaft thereof is transmitted to the rotating shaft via a first and second coupling levers, and the valve element is driven to be opened or closed, thereby restricting exhaust gas distributed through the exhaust pipe.

Specifically, the second coupling lever having a pair of engagement holes is secured to the output shaft of the motor unit, and the first coupling lever having a pair of engagement pieces is secured to the rotating shaft. Each engagement hole and each engagement piece are engaged with each other, rattling is prevented by a compression spring, and relative rotation between the first coupling lever and the second coupling lever around an axial line of the rotating shaft is thus restricted. Therefore, if the output shaft of the motor unit rotates, then the rotation is transmitted from the second coupling lever to the rotating shaft through the first coupling lever, and the valve element is opened or closed in accordance with the rotation of the output shaft.

The pair of engagement pieces of the first coupling lever extend from a disc-shaped sealing surface secured to the rotating shaft toward the motor unit side, and the sealing surface abuts on one of axially supported portions of the rotating shaft and plays a role in sealing a minute clearance formed by the bearing. In a case in which the exhaust valve device is provided on an upstream side relative to a catalyst for purifying exhaust gas in the exhaust pipe of the engine, unpurified exhaust gas is distributed through the exhaust passage of the valve body, and leakage of the exhaust gas to the outside is prevented with such a layout.

Incidentally, since the specification of the exhaust valve device is determined in accordance with various conditions required by a vehicle side (hereinafter, referred to as vehicle-side installation condition), the specification of the exhaust valve device is changed to adapt to vehicle-side installation conditions required by vehicles in a case in which the exhaust valve device is mounted in different vehicles. Specifically, the valve body may be changed in accordance with an opening diameter of the exhaust pipe of the vehicle, the motor unit may be changed in accordance with a required limit of exhaust gas, or an angle at which the motor unit is secured to the valve body may be changed in accordance with an installation space in the periphery of the exhaust pipe. Since the coupling state between the output shaft of the motor unit and the rotating shaft also changes with such a change in specification of the exhaust valve device, a need to replace the first coupling lever and the second coupling lever inevitably occurs.

However, the first coupling lever, in particular, plays a role not only in transmitting rotation but also in sealing the axially supported portion of the rotating shaft and is produced with high precision to reliably seal exhaust gas. A need to newly produce such an entire first coupling lever leads to a sudden increase in manufacturing costs, which is problematic.

The present invention was made to solve such a problem, and an object thereof is to provide an exhaust valve device for a vehicle capable of handling, with a simple specification change, a case in which the exhaust valve device is mounted in vehicles with different vehicle-side installation conditions.

SUMMARY OF THE INVENTION

In order to achieve the aforementioned object, an exhaust valve device for a vehicle according to the present invention is an exhaust valve device for a vehicle in which a valve element is supported to be able to be opened and closed in an exhaust passage by a rotating shaft axially supported by a valve body, a flexible joint member with flexibility is secured to an output shaft of an actuator attached to the valve body, and one end of the flexible joint member and one end of the rotating shaft projecting from the valve body are coupled via a rigid joint member, wherein the rigid joint member includes: a sealing element having a sealing surface and a driven engagement portion, the sealing surface being coupled to the end of the rotating shaft and sealing an axially supported portion of the end of the rotating shaft to prevent exhaust gas from leaking from the exhaust passage through the axially supported portion, the driven engagement portion being formed in a periphery of the sealing surface; and a transmission element having a coupling portion and a driving engagement portion, the coupling portion being coupled to the end of the flexible joint member, the driving engagement portion being engaged with the driven engagement portion of the sealing element to restrict relative rotation about an axial line of the rotating shaft.

According to the exhaust valve device for a vehicle of the present invention, it is possible to handle, with a simple specification change, a case in which the exhaust valve device is mounted in vehicles with different vehicle-side installation conditions.

DETAILED DESCRIPTION OF THE INVENTION

Figure 1:
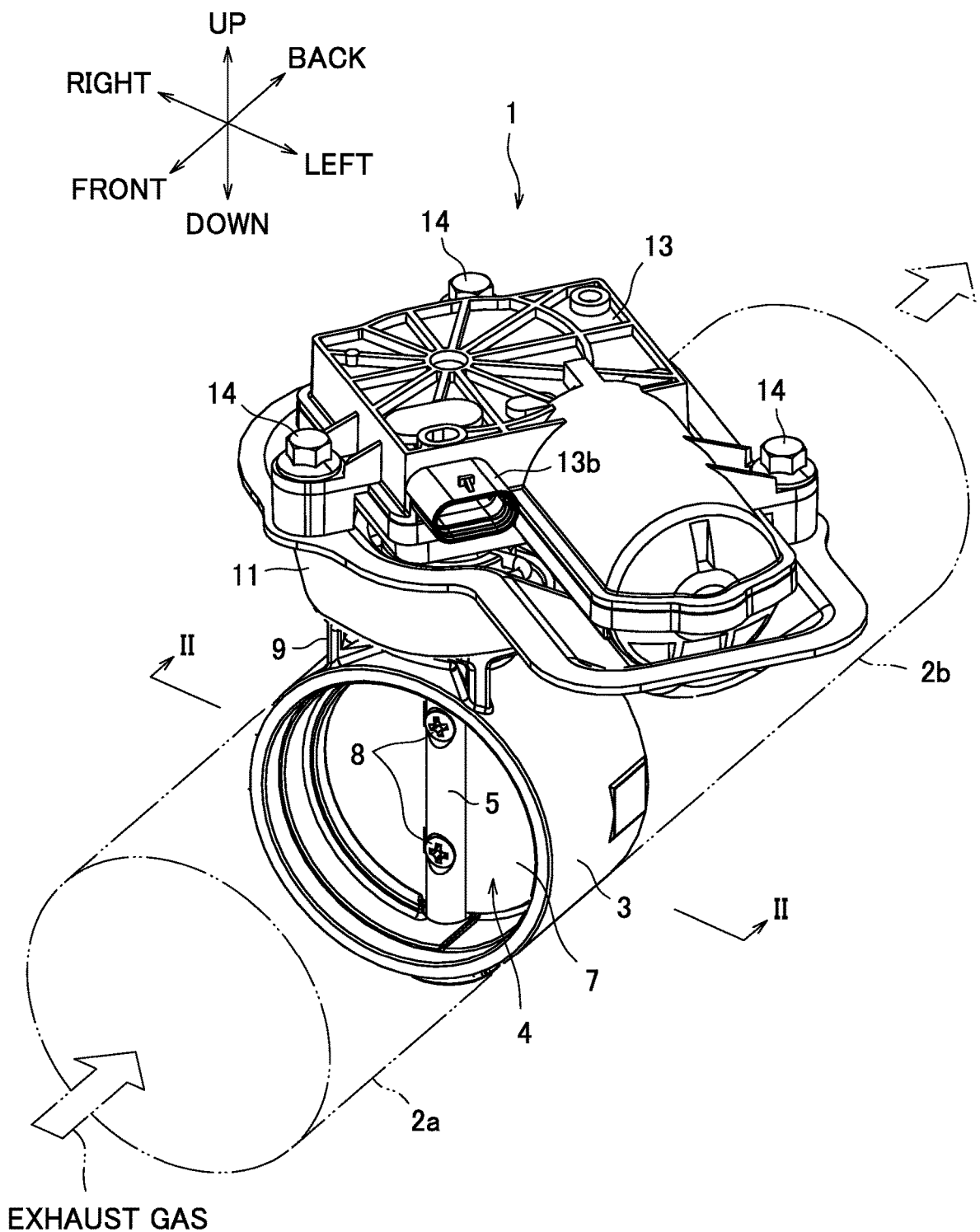
FIG. 1 is a perspective view illustrating an exhaust valve device according to an embodiment.

Hereinafter, an embodiment in which the present invention is implemented as an exhaust valve device for a four-wheel vehicle will be described.

An exhaust valve device 1 is installed below a floor of a vehicle, which is not illustrated, in the posture illustrated in FIG. 1, and in the following description, front and back, left and right, and upper and lower directions will be expressed using the vehicle as a subject. Exhaust pipes 2a and 2b from an engine extend backward below the floor of the vehicle, the exhaust pipe 2a on the upstream side and the exhaust pipe 2b on the downstream side communicate with each other via an exhaust passage 4 formed in a valve body 3 of the exhaust valve device 1, and the exhaust pipe 2b on the downstream side is provided with a catalyst for purifying exhaust and a silencer although not illustrated.

Figure 2:
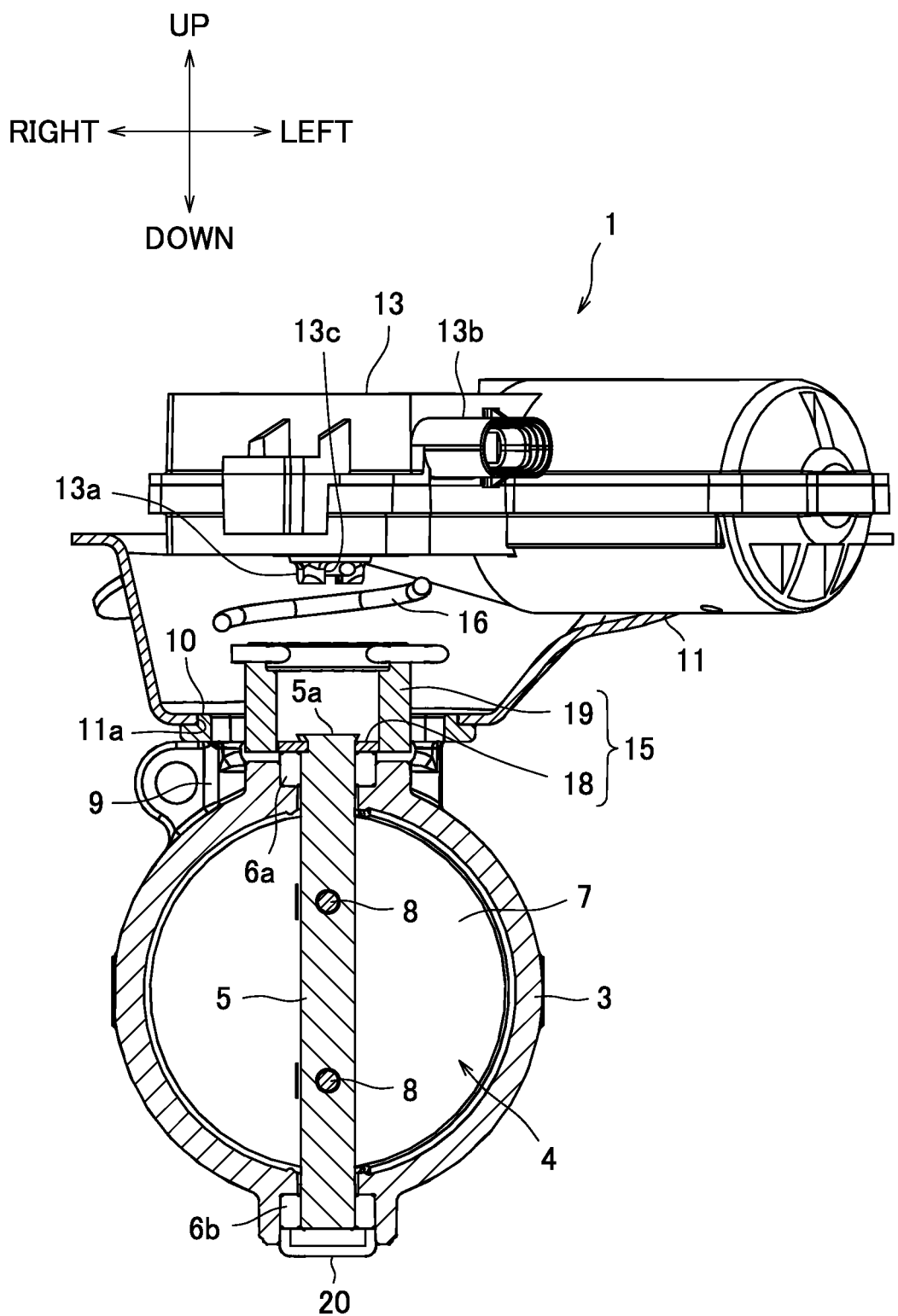
FIG. 2 is a sectional view along the line II-II in FIG. 1 illustrating the exhaust valve device.
Figure 3:
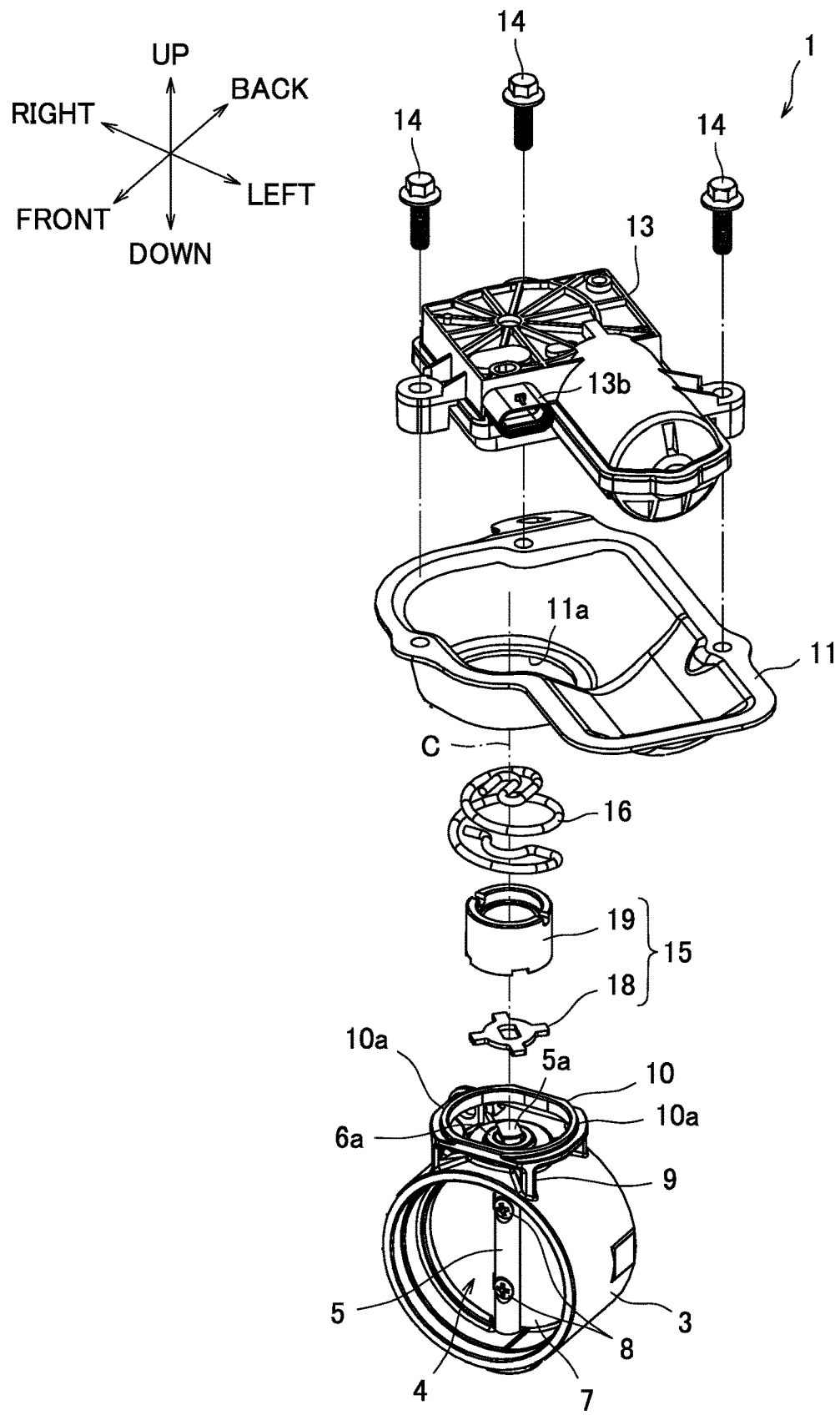
FIG. 3 is an exploded perspective view illustrating the exhaust valve device.

As illustrated in FIGS. 1 to 3, a rotating shaft 5 is disposed in the exhaust passage 4 with a circular sectional shape of the valve body 3, and an upper portion and a lower portion of the rotating shaft 5 are axially supported to be able to turn by bearings 6a and 6b. A disc-shaped valve element 7 is secured to the rotating shaft 5 with a pair of screws 8 in the exhaust passage 4, and the exhaust passage 4 is opened and closed by the valve element 7 in accordance with turning of the rotating shaft 5. Note that the support with the bearings 6a and 6b is not always necessary, and the rotating shaft 5 may be axially supported directly by an axial hole formed in the valve body 3 with the support with the bearings 6a and 6b omitted.

A base portion 9 for securing a thermal insulation bracket 11 and a motor unit 13, which will be described later, is integrally formed above the valve body 3, and an upper end of the rotating shaft 5 projects upward at the center of the base portion 9. A guide portion 10 with an annular shape around an axial line C of the rotating shaft 5 at the center projects above the base portion 9, and an outer circumferential surface thereof serves as guide surfaces 10a. The guide surface 10a is split into a left part and a right part, each of which has an arc shape around the axial line C of the rotating shaft 5 at the center, by a front portion and a back portion of the guide portion 10 being linearly chamfered in accordance with the front-back length of the valve body 3.

The thermal insulation bracket 11 produced by press-molding a steel sheet is disposed above the valve body 3, the thermal insulation bracket 11 has a dish shape recessed upward, and a guide hole 11a penetrating therethrough on one side is fitted onto the guide portion 10 of the valve body 3. Since the inner diameter of the guide hole 11a conforms to the outer diameter formed by the pair of guide surfaces 10a of the guide portion 10, it is possible to arbitrarily change an angle into an angle of the thermal insulation bracket 11 around the axial line C of the rotating shaft 5 at the center while bringing the inner periphery of the guide hole 11a into slide contact with the guide surfaces 10a, and the thermal insulation bracket 11 is secured to the valve body 3 through spot welding (illustrated as W1 in FIG. 7) after a prescribed securing angle is achieved. However, the structure for securing the thermal insulation bracket 11 is not limited thereto and can be arbitrarily changed.

The motor unit 13 as an actuator in the present invention is disposed above the thermal insulation bracket 11 and is secured thereto with three bolts 14, and an output shaft 13a of the motor unit 13 oriented downward is disposed on the axial line C of the rotating shaft 5 to face the upper end of the rotating shaft 5 at a predetermined interval in the thermal insulation bracket 11. Although not illustrated, the motor unit 13 incorporates a motor and a deceleration mechanism therein, such that the motor is operated through power supply via a connector 13b provided on one side and the rotation thereof is decelerated by the deceleration mechanism to drive and rotate the output shaft 13a.

Figure 4:
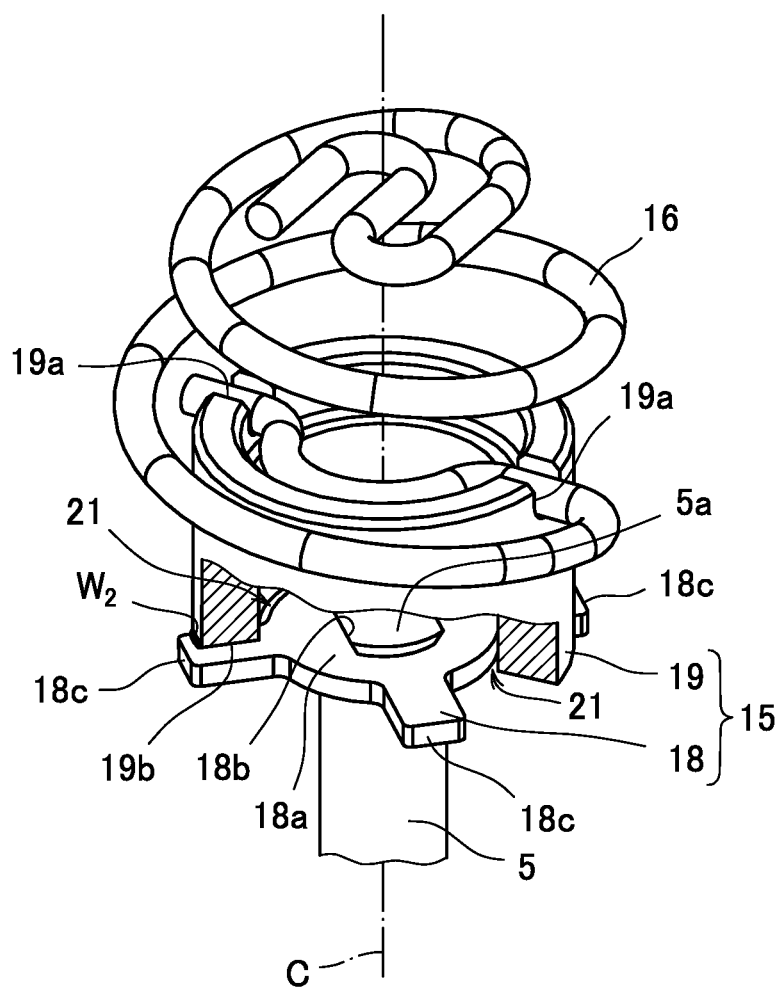
FIG. 4 is an assembly perspective view illustrating details of a rigid joint member and a flexible joint member.
Figure 5:
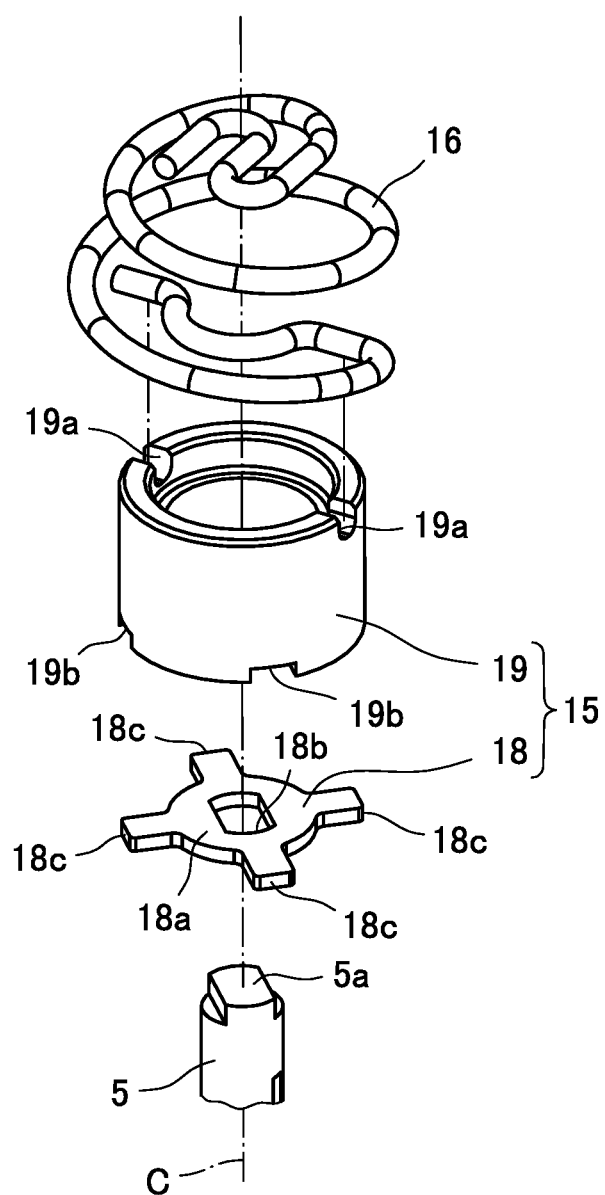
FIG. 5 is an exploded perspective view illustrating details of the rigid joint member and the flexible joint member.

A rigid joint member 15 is secured to the upper end of the rotating shaft 5 in the thermal insulation bracket 11. Although details of the rigid joint member 15 will be described later, rotation of the output shaft 13a of the motor unit 13 is transmitted to the rotating shaft 5 of the valve body 3 via the rigid joint member 15 and a flexible joint member 16. As illustrated in FIGS. 2, 4, and 5, the flexible joint member 16 is produced by spirally winding a wire material such as a piano wire, an upper end thereof is fitted into a spring groove 13c formed in the output shaft 13a, and a lower end thereof is fitted into a spring groove 19a as a coupling portion in the present invention formed at an upper end of the rigid joint member 15, specifically, an upper end of a transmission element 19, which will be described later. The flexible joint member 16 is interposed with elasticity between the output shaft 13a and the rigid joint member 15, thereby preventing dropping from a prescribed disposition state.

The flexible joint member 16 has such a spiral shape and thus has both thermal insulation properties and flexibility. Also, heat transmission from the valve body 3 that has been excessively heated by exhaust gas to the motor unit 13 is insulated due to the thermal insulation properties of the flexible joint member 16, and along with insulation of radiant heat from the valve body 3 achieved by the thermal insulation bracket 11, an effect of protecting the motor unit 13 from heat damage is obtained. In addition, the flexibility of the flexible joint member 16 has an effect of absorbing slight deviation of the axial line C between the side of the rigid joint member 15 and the side of the output shaft 13a, and this contributes to relaxation of precision required for the transmission element 19 of the rigid joint member 15 as will be described later in detail.

Next, details of the rigid joint member 15 will be described.

Figure 7:
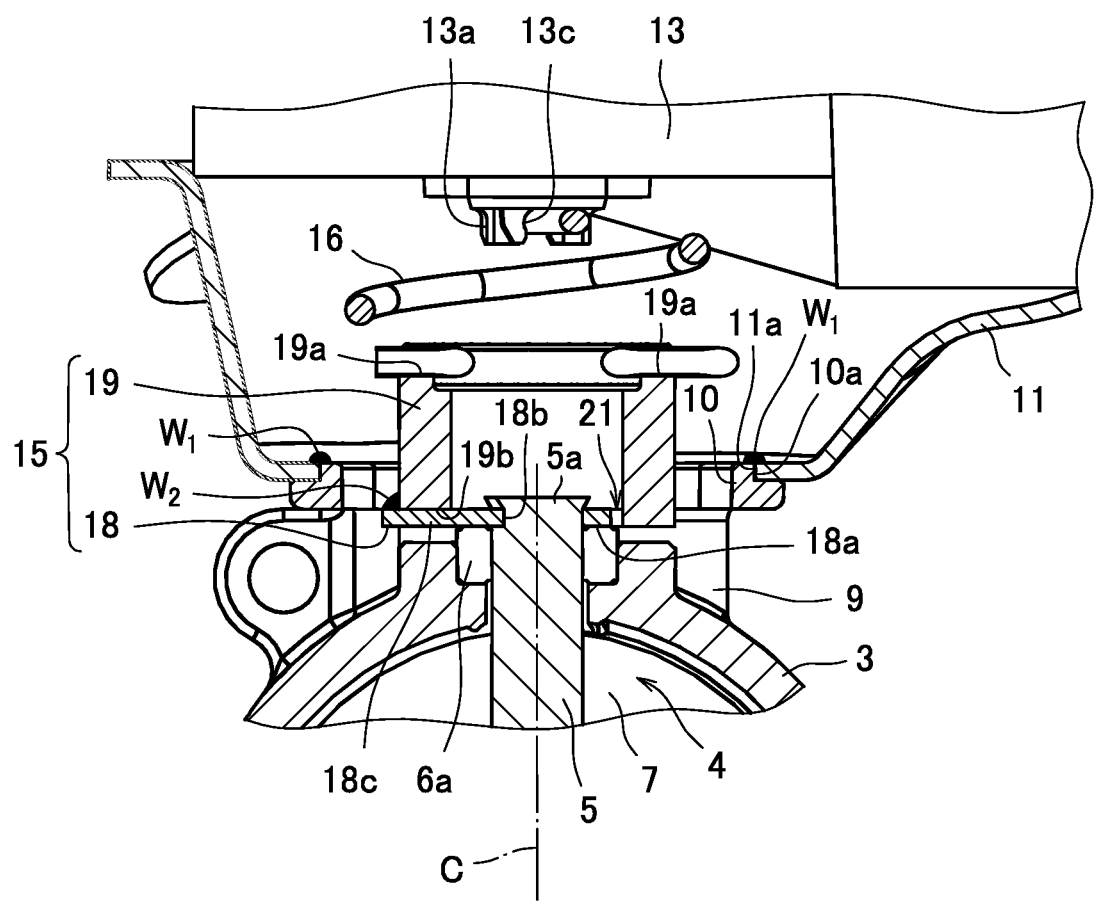
FIG. 7 is a partially enlarged sectional view of FIG. 2 illustrating a bonded state of a rotating shaft, the rigid joint member, the flexible joint member, and an output shaft of a motor unit.

As illustrated in FIGS. 4, 5, and 7, the rigid joint member 15 is configured of a sealing element 18 sealing the axially supported portion of the rotating shaft 5 and the transmission element 19 transmitting rotation of the motor unit 13 to the rotating shaft 5 as a whole. The sealing element 18 has a flat plate shape produced by punching a steel sheet through pressing, the transmission element 19 has a cylindrical shape produced by cutting a steel pipe into a predetermined length, and each for them, a material with high heat resistance such as stainless steel is used.

The individual shapes of the sealing element 18 and the transmission element 19 can be arbitrarily set as long as the rigid joint member 15 with a prescribed shaped is formed therewith. However, the reason that the sealing element is still formed into a flat plate shape while the transmission element 19 is formed into a tubular shape is able to facilitate the production thereof through punching and cutting of the steel pipe through pressing. It is a matter of course that the sealing element 18 and the transmission element 19 may have other shapes as long as they can be engaged with each other.

The sealing surface 18a of the sealing element 18 has a circular shape, an axial hole 18b penetrates therethrough at the center, and arm portions 18c as a driven engagement portion in the present invention extend in the outer circumferential direction from four locations that equally dividing the periphery of the sealing surface 18a respectively. A riveting portion 5a with width across flat is formed at the upper end of the rotating shaft 5 projecting from above the base portion 9, and the axial hole 18b of the sealing element 18 is fitted onto the riveting portion 5a from the upper side. Relative rotation of the sealing element 18 is restricted by the axial hole 18b having the shape with width across flat corresponding to the riveting portion 5a, the riveting portion 5a is crushed through the riveting to prevent the riveting portion 5a from falling off from the axial hole 18b, and as a result, the sealing element 18 is secured to the upper end of the rotating shaft 5.

The sealing surface 18a of the sealing element 18 abuts the axially supported portion above the valve body 3 from the upper side to seal a minute clearance formed by the bearing 6a. Although unpurified exhaust gas is distributed in the exhaust passage 4 of the valve body 3 when the engine is operated, the sealing surface 18a prevents a situation in which the exhaust gas leaks to the outside through the clearance of the bearing 6a. Note that for the bearing 6b below the valve body 3, leakage of exhaust gas from the exhaust passage 4 is prevented by attaching a sealing cap 20 thereto, as illustrated in FIG. 2.

Also, the spring groove 19a is formed at an upper end of the transmission element 19, and the lower end of the flexible joint member 16 is fitted thereinto as described above. Engagement grooves 19b as a driving engagement portion in the present invention are formed respectively at four locations equally dividing the lower end of the transmission element 19 corresponding to the arm portions 18c of the sealing element 18, and each engagement groove 19b is formed to have a width that conforms to the width of each arm portion 18c or to have a width that is slightly wider than the width of each arm portion 18c. The transmission element 19 is disposed on the sealing element 18 from the upper side, each arm portion 18c of the sealing element 18 is fitted into each engagement groove 19b thereof, and relative rotation between the sealing element 18 and the transmission element 19 around the axial line C of the rotating shaft 5 is thus restricted. As a result, rotation of the output shaft 13a of the motor unit 13 is transmitted to the rotating shaft 5 via the flexible joint member 16 and the rigid joint member 15, and the valve element 7 is driven to be opened or closed, thereby restricting exhaust gas distributed through the exhaust pipes 2a and 2b. Note that the shapes of the driving engagement portion and the driven engagement portion are not limited thereto as long as it is possible to restrict relative rotation through engagement therebetween and can be arbitrarily changed.

Figure 6:
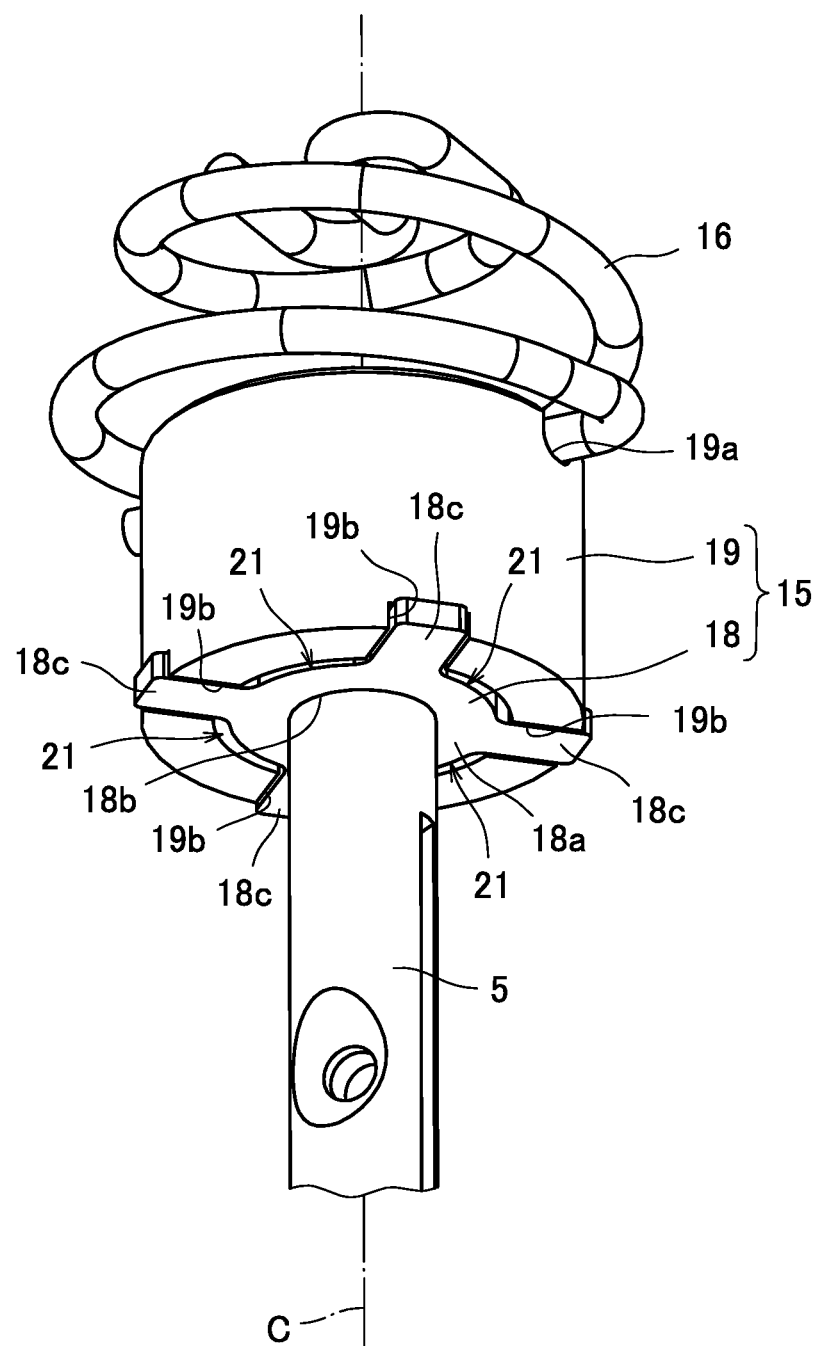
FIG. 6 is a perspective view of FIG. 4 illustrating a bonded state of a sealing element of the rigid joint member and a transmission element.

As illustrated in FIGS. 6 and 7, in particular, the distal end of each arm portion 18c projects slightly to the outer circumferential side beyond the outer circumferential surface of the transmission element 19 to form a corner portion between the distal end and the outer circumferential surface, and the sealing element 18 and the transmission element 19 are bonded to each other by performing fillet-welding on each of them (illustrated as W2 in FIG. 7). Since the fillet-welding is enabled by setting such a length for the arm portions 18c, it is possible to easily perform the welding operation as compared with a case in which distal ends of the arm portions 18c are in the same surface as the outer circumferential surface of the transmission element 19, for example. Note that since the fitted state of the arm portions 18c into the engagement grooves 19b is maintained with elasticity of the flexible joint member 16 as described above after the sealing element 18 and the transmission element 19 are assembled with the exhaust valve device 1 at prescribed disposition, the welding operation is not necessarily performed and may be omitted.

As illustrated in FIGS. 6 and 7, the outer diameter of the sealing surface 18a of the sealing element 18 is set to be slightly smaller than the inner diameter of the transmission element 19. Therefore, four arc-shaped slits 21 as clearances in the present invention are formed between the inner circumferential surface of the transmission element 19 and the outer periphery of the sealing surface 18a, and the upper side and the lower side of the sealing element 18 communicate with each other via each slit 21. Dust, muddy water, and the like (hereinafter, referred to as foreign matters) may drop to the exhaust valve device 1 disposed below the floor of the vehicle, and these foreign matters may enter the transmission element 19 of the rigid joint member 15 through the inside of the thermal insulation bracket 11. The foreign matters accumulated in the transmission element 19 rotating along with the rotating shaft 5 interrupt turning of the rotating shaft 5 and also interrupt satisfactory control responsiveness of the exhaust valve device 1 due to an increase in inertial weight of the rigid joint member 15. Further, there is a probability that the accumulated foreign matters cause corrosion degradation of the transmission element 19 and the rotating shaft 5 and the sealing element 18 which are located in the vicinity of the transmission element 19. The foreign matters that have entered the transmission element 19 are discharged downward to the outside by the slit 21 being formed, and it is thus possible to prevent troubles caused by the foreign matters in advance.

The exhaust valve device 1 configured as described above is assembled in the following procedure, for example.

The individual components such as the sealing element 18, the transmission element 19, the rotating shaft 5, and the flexible joint member 16 are produced in advance, and then, first, the upper end of the rotating shaft 5 is inserted into the axial hole 18b of the sealing element 18 and is bonded thereto through riveting. Then, the transmission element 19 is disposed above the sealing element 18, the arm portions 18c of the sealing element 18 are fitted into the engagement grooves 19b of the transmission element 19, and each of corner portions of the distal ends of the arm portions 18c is welded, thereby completing the rigid joint member 15. If the rotating shaft 5 is inserted into the bearings 6a and 6b of the valve body 3 from the upper side, then the sealing surface 18a of the rigid joint member 15 abuts on the axially supported portion on the upper side, and in this state, the valve element 7 is secured to the rotating shaft 5 in the exhaust passage 4 with the screws 8.

Next, the guide hole 11a of the thermal insulation bracket 11 is fitted onto the guide portion 10 of the valve body 3 and is bonded thereto through spot welding at a prescribed securing angle. Thereafter, the flexible joint member 16 is disposed above the transmission element 19 of the rigid joint member 15, and the motor unit 13 is disposed on the thermal insulation bracket 11 from the upper side and is secured thereto with the bolts 14. In this manner, the flexible joint member 16 is interposed with elasticity between the output shaft 13a of the motor unit 13 and the transmission element 19 of the rigid joint member 15, and the operation of assembling the exhaust valve device 1 is completed. It is a matter of course that the procedure for the assembly operation is not limited thereto and can be arbitrarily changed.

Next, advantages of the exhaust valve device 1 configured as described above will be described.

The rigid joint member 15 of the exhaust valve device 1 according to the embodiment has a function of sealing the axially supported portion of the rotating shaft 5 and a function of transmitting rotation from the motor unit 13 to the rotating shaft 5 and can thus be regarded as a member corresponding to the first coupling lever of the exhaust valve device in Japanese Patent Laid-Open No. 2019-120252 described in [Description of the Related Art]. In a case in which the exhaust valve device 1 is mounted in a different vehicle, the motor unit 13 may be changed, and the angle at which the motor unit 13 is secured to the valve body 3 may be changed to adapt to vehicle-side installation conditions required by the vehicle. However, according to the technique disclosed in Japanese Patent Laid-Open No. 2019-120252, there is a need to newly produce the entire first coupling lever.

On the other hand, according to the embodiment, the rigid joint member 15 is configured of the sealing element 18 and the transmission element 19, and there is thus no need to newly produce the entire rigid joint member 15 even in the case in which the motor unit 13 is changed or in the case in which the securing angle thereof is changed in the installation on a different vehicle. The reason thereof will be described below.

First, component precision required for the sealing element 18 and the transmission element 19 and manufacturing methods thereof will be described as assumption of the description. The sealing surface 18a of the sealing element 18 sealing the axially supported portion of the rotating shaft 5 requires high flatness to prevent leakage of exhaust gas through tight adhesion to an end surface of the bearing 6a. On the other hand, each arm portion 18c extending from the sealing surface 18a does not need such high precision as long as the arm portion 18c can be fitted into each engagement groove 19b and be bonded to the transmission element 19. Also, since there is a clear difference in shapes between the disc-shaped sealing surface 18a and each thin and long arm extending from the sealing surface 18a in the outer periphery, in other words, since there is a large change in shape at a boundary therebetween, the sealing surface 18a is unlikely to be affected by deformation of the arm portions 18c.

A shear force acting on the steel sheet in the punching through the pressing may be a reason of deformation of parts, the circular sealing surface 18a is originally unlikely to be deformed as compared with the arm portions 18c with a thin and long shape. Further, since the sealing surface 18a and the arm portions 18c have different shapes as described above, the sealing surface 18a is unlikely to be affected by deformation even if the arm portions 18c are deformed due to the shear force. Also, although the arm portions 18c may be deformed when the arm portions 18c are fitted into the engagement grooves 19b, the same applies to that case. As a result, it is possible to achieve prescribed precision of parts and to produce the sealing element 18 by a simple manufacturing method, namely punching through pressing.

On the other hand, the transmission element 19 is produced by cutting the steel pipe, and it is difficult to state that precision of the parts is high. However, since deviation of the axial line C with the output shaft 13a is absorbed by the flexibility of the flexible joint member 16, it is possible to transmit rotation with no problems even if the entire precision of the transmission element 19 is low to some extent, and as a result, it is possible to produce the transmission element 19 by a simple manufacturing method, namely cutting of the steel pipe.

In a case in which the rigid joint member 15 is produced as an integrated part without splitting it as in the embodiment, a manufacturing method such as cutting from a solid wood or casting is conceivable. However, the cutting may be a reason of an increase in manufacturing costs. It is a matter of course that the manufacturing costs increase in the case of using a solid wood, and even in the case of the casting, it is necessary to cut the portion corresponding to the sealing surface 18a that requires high flatness, and cost problems thus occur in both cases. According to the embodiment in which the rigid joint member 15 is individually produced by splitting it into the sealing element 18 and the transmission element 19, it is possible to achieve high flatness required by the sealing surface 18a and to manufacture each member by a simple manufacturing method. In addition, the bonding operation between the sealing element 18 and the transmission element 19 can be simply performed by fillet-welding, and the bonding operation between the rigid joint member 15 and the rotating shaft 5 can be simply performed by riveting, which significantly contribute to easiness of manufacturing.

For the aforementioned reasons, it is possible to obtain an advantage that the rigid joint member 15 can be produced by a simple manufacturing method and cost reduction can be achieved even in a case in which the exhaust valve device 1 is simply produced in accordance with a specific vehicle, in addition to the case in which the specification of the exhaust valve device 1 is changed to be mounted in a different vehicle.

Next, a case in which the motor unit 13 is changed to adapt to vehicle-side installation conditions will be described. In this case, the shape of the flexible joint member 16 also changes in accordance with a change in shape of the output shaft 13a of the motor unit 13. Therefore, although there is a need to change the shape of the transmission element 19 of the rigid joint member 15 engaged with the flexible joint member 16, the sealing element 18 can be handled with a common member.

Figure 8:
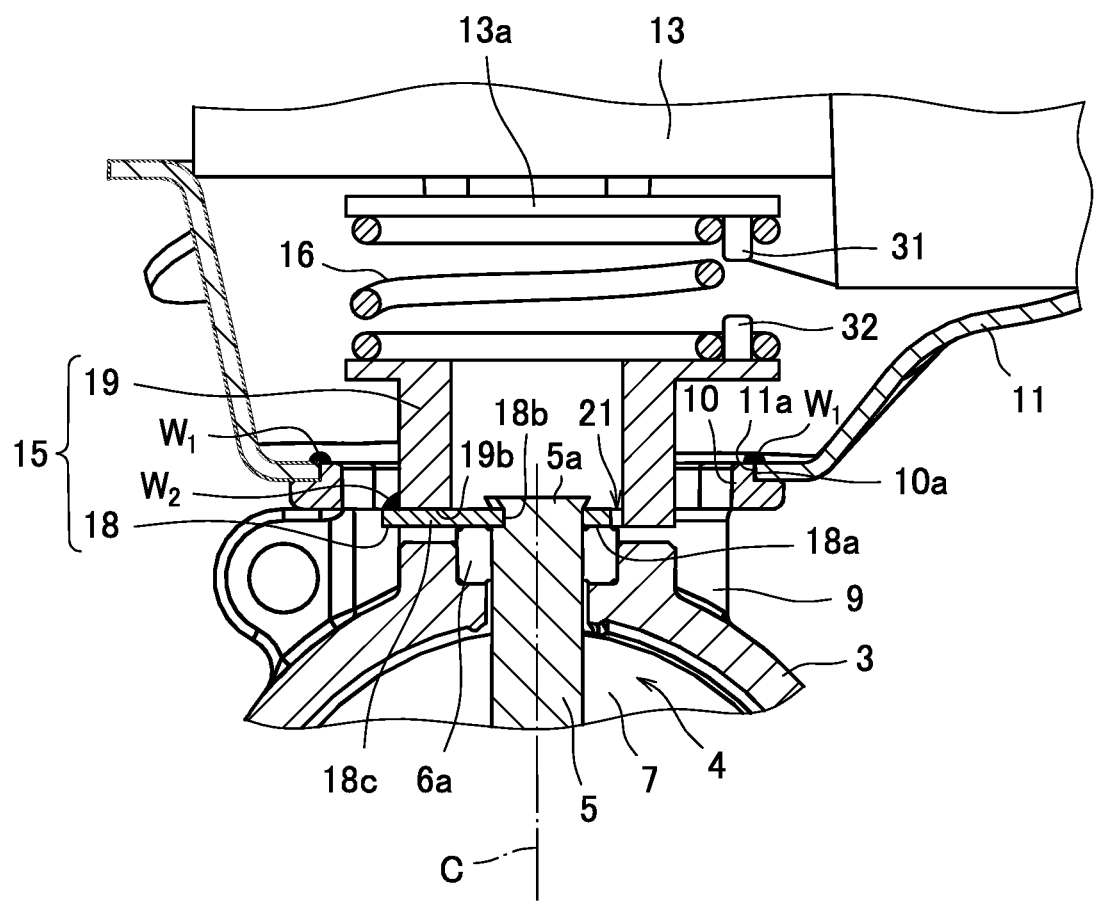
FIG. 8 is a sectional view corresponding to FIG. 7 illustrating an example with a change to a motor unit different from that in the embodiment.

FIG. 8 illustrates an example in which the motor unit 13 is changed to one different from that in the embodiment, and the output shaft 13a is provided with a pin 31 to stand downward instead of the spring groove 13c. Therefore, the upper end of the flexible joint member 16 is hooked at the pin 31. The upper end of the transmission element 19 is provided with a pin 32 to stand upward, and the lower end of the flexible joint member 16 is hooked at the pin 32 so as to follow the aforementioned engaged state. Therefore, although there is a need to use the transmission element 19 provided with the pin 32 with a different shape from that in the embodiment, it is not necessary to change the shape of the sealing element 18, and it is thus possible to use the sealing element 18 that is common to that in the embodiment. As a result, the specification change of the exhaust valve device 1 corresponding to the change in the motor unit 13 is completed merely by replacing only the transmission element 19 that can be simply produced, and it is possible to address the specification change at much lower costs as compared with a case in which the entire rigid joint member 15 is replaced, for example.

On the other hand, a case where the angle at which the motor unit 13 is secured to the valve body 3 is changed to adapt to vehicle-side installation conditions will be described. The arm portions 18c are formed at four locations equally dividing the sealing element 18, and the engagement grooves 19b are formed at four locations equally dividing the transmission element 19. As a result, each arm portion 18c and each engagement groove 19b are disposed at equal intervals of 90° around the axial line C of the rotating shaft 5 at the center, and it is possible to arbitrarily bond the sealing element 18 to the transmission element 19 at four positions with different angles at intervals of 90°. In a case in which the securing angle is changed to any of 90°, 180°, and 270° for mounting the exhaust valve device in different vehicles with reference to the securing angle of the motor unit 13 with respect to the valve body 3 in the embodiment, for example, the change is completed merely by bonding the sealing element 18 to the transmission element 19 corresponding to the securing angle. In this case, since it is possible to use the members common to those in the embodiment without replacing any of the sealing element 18 and the transmission element 19, it is possible to handle this with no increase in costs.

It is a matter of course that the disposition of the arm portions 18c and the engagement grooves 19b is not limited to the aforementioned disposition, and for example, the arm portions 18c and the engagement grooves 19b may be formed at three locations equally dividing around the axial line C of the rotating shaft 5 respectively. Also, in a case in which a vehicle in which the exhaust valve device may be mounted is known in advance, it is only necessary to form the arm portions 18c and the engagement grooves 19b in consideration of vehicle-side installation conditions thereof. In a case in which the securing angle is changed by 45° for mounting the exhaust valve device in a different vehicle with reference to the securing angle in the embodiment, for example, it is only necessary to form the engagement grooves 19b at eight locations at intervals of 45° with the arm portions 18c still formed at the four locations at intervals of 90°.

Aspects of the present invention are not limited to the embodiment. Although the aforementioned embodiment is implemented as the exhaust valve device 1 for a four-wheel vehicle, the present invention may be applied to an exhaust valve device for a two-wheel vehicle or a three-wheel vehicle, for example, instead.

REFERENCE SIGNS LIST

1 Exhaust valve device
3 Valve body
4 Exhaust passage
5 Rotating shaft
13 Motor unit (actuator)
13a Output shaft
15 Rigid joint member
16 Flexible joint member
18 Sealing element
18a Sealing surface
18c Arm portion (driven engagement portion)
19 Transmission element
19a Spring groove (coupling portion)
19b Engagement groove (driving engagement portion)
21 Slit (clearance)

What is claimed is:

1. An exhaust valve device for a vehicle in which a valve element is supported to be able to be opened and closed in an exhaust passage by a rotating shaft axially supported by a valve body, a flexible joint member with flexibility is secured to an output shaft of an actuator attached to the valve body, and one end of the flexible joint member and one end of the rotating shaft projecting from the valve body are coupled via a rigid joint member,
   wherein the rigid joint member includes
   a sealing element having a sealing surface and a driven engagement portion, the sealing surface being coupled to the end of the rotating shaft and sealing an axially supported portion of the end of the rotating shaft to prevent exhaust gas from leaking from the exhaust passage through the axially supported portion, the driven engagement portion being formed in a periphery of the sealing surface, and
   a transmission element having a coupling portion and a driving engagement portion, the coupling portion being coupled to the end of the flexible joint member, the driving engagement portion being engaged with the driven engagement portion of the sealing element to restrict relative rotation about an axial line of the rotating shaft, and
   wherein the sealing element of the rigid joint member has a flat plate shape with a plurality of arm portions extending as the driven engagement portion in an outer circumferential direction from the periphery of the sealing surface, and
   the transmission element of the rigid joint member has a cylindrical shape with one end at which the coupling portion is formed and the other end at which a plurality of engagement grooves are formed as the driving engagement portion such that each of the arm portions of the sealing element is fitted to each of the engagement grooves.

2. The exhaust valve device for a vehicle according to claim 1,
   wherein the sealing element is produced by punching a steel sheet into the flat plate shape with the sealing surface and the arm portions through pressing, and
   the transmission element is produced by cutting a steel pipe into a predetermined length and forming the coupling portion at one end and the engagement grooves at the other end.

3. The exhaust valve device for a vehicle according to claim 1, wherein the arm portions of the sealing element and the engagement grooves of the transmission element are disposed respectively at equal intervals around the axial line of the rotating shaft at the center.

4. The exhaust valve device for a vehicle according to claim 1, wherein a clearance is formed between the sealing surface of the sealing element and an inner circumferential surface of the transmission element.

5. The exhaust valve device for a vehicle according to claim 1, wherein a distal end of each of the arm portions of the sealing element extends toward an outer circumferential side beyond an outer circumferential surface of the transmission element and is fillet-welded thereto.

* * * * *